United States Patent [19]
Plummer

[11] 3,821,767
[45] June 28, 1974

[54] LIGHT SEAL FOR A REFLEX CAMERA VIEWFINDER

[75] Inventor: William T. Plummer, Concord, Mass.

[73] Assignee: Polaroid Corporation, Cambridge, Mass.

[22] Filed: Sept. 29, 1972

[21] Appl. No.: 293,484

Related U.S. Application Data
[63] Continuation-in-part of Ser. No. 151,255, June 9, 1971.

[52] U.S. Cl. .................................. 95/42, 95/11 V
[51] Int. Cl. ........................................ G03b 19/12
[58] Field of Search .......................... 95/42, 11 V

[56] References Cited
UNITED STATES PATENTS
| | | | |
|---|---|---|---|
| 3,540,364 | 11/1970 | Ono | 95/42 |
| 3,540,365 | 11/1970 | Ishizaka | 95/42 |

*Primary Examiner*—Richard M. Sheer
*Assistant Examiner*—E. M. Bero

[57] ABSTRACT

A resilient flap prevents light from entering a reflex camera through a viewfinder during a photographic exposure. A film unit stored in the camera is covered by a capping plate, in its first position, during framing and focusing. When the shutter operates, the capping plate pivots about one end, into its second position, to uncover the film unit for an exposure. The resilient flap, extending from the free end of the capping plate, is swung to a position where it will block light which would otherwise enter the camera through the viewfinder. It has a width less than the width of the film unit it helps to protect and it prevents light entering through the viewfinder from reaching the film unit while the capping plate moves between the first and second positions. The use of a resilient material in the flap allows it to conform to a non-rigid wall which separates the viewfinder from the camera.

23 Claims, 4 Drawing Figures

PATENTED JUN 28 1974 3,821,767

3,821,767

LIGHT SEAL FOR A REFLEX CAMERA VIEWFINDER

This application is a continuation-in-part of my copending patent application, Ser. No. 151,255, filed June 9, 1971 now U.S. Pat. No. 3,754,458.

BACKGROUND OF THE INVENTION

The present invention is particularly useful in a folding reflex camera such as the one described in United States patent application, Ser. No. 28,567, filed Apr. 15, 1970, in the name of Edwin H. Land, and assigned to Polaroid Corporation now U.S. Pat. No. 3,672,281.

In such a camera, a flexible boot encloses an exposure chamber so that the lighttight integrity of the chamber can be maintained whether the camera is erected for use or folded for storage. An aperture in an upper surface of the flexible boot permits light from the focal plane to enter a viewfinder. At certain times, e.g., while the reflex mirror moves into position and during an exposure, it is necessary to prevent light that might enter the exposure chamber through the viewfinder, via the aperture in the flexible boot, from fogging film in the reflex camera. Because the aperture is in a flexible member, it is impractical to use common means, such as shutter blades, for closing it. There is no convenient way to attach such means to the flexible boot that will keep it aligned with the aperture, and there is no room for a typical closing mechanism when the camera is folded for storage. Further, the flexible nature of the surface surrounding the aperture raises serious doubts as to whether rigid mechanical components can adequately close the aperture and also whether or not such mechanical components would interfere with the proper collapsing of the flexible boot when the reflex camera was folded for storage.

In the aforementioned reflex camera, a capping plate carrying a mirror, which mirror is part of the photographic optics, must be rotated upwards prior to exposing a film unit to uncover the film unit and put the mirror into the required position. Typically, the upward rotation of the capping plate is initiated by operating the shutter release. The capping plate must then move into its upward position and stop with the mirror in place. This must be done quickly to avoid delay between operating the shutter release and opening the shutter. During the upward movement of the capping plate, the camera shutter is closed, but some means must prevent light entering the viewfinder from reaching the film unit and fogging it. Further, the capping plate carrying the mirror must not jolt the camera when it stops in the upward position lest a photographer's aim be disturbed, and it must not bounce or vibrate lest the resulting motion of the mirror blur a photograph.

An object of the present invention is to provide means for closing the aperture in the flexible boot during photographic exposures.

Another object of the present invention is to provide means for preventing light entering the viewfinder from fogging a film unit during the upward movement of the capping plate until the aperture is closed.

Another object of the present invention is to reduce the impact of the capping plate stopping in its upward position.

Yet another object of the present invention is to reduce bouncing and vibration of the mirror during a photographic exposure.

A further object is to provide a single means for accomplishing the preceding objects.

SUMMARY OF THE INVENTION

These and other objects of the invention are accomplished by a wide flexible member attached to the moving end of a capping plate carrying a reflex mirror on its lower side. A rubber boot encloses an exposure chamber, where the capping plate and a film cassette are situated, so as to exclude light from the chamber. The capping plate normally covers the film cassette to prevent light from fogging the film units therein. In an upper wall of the boot, a small aperture admits light from a focusing screen, attached to the upper side of the capping plate, into a viewfinder located above the camera. During a photographic exposure, the capping plate rotates upward, with the flexible member extending forward so as to prevent the direct passage of light from the aperture to a film unit. As it continues to move upward, it swings the flexible member into contact with the upper wall. Continued rotation drags the flexible member along the wall to close the aperture in the upper wall preventing light from entering the exposure chamber through the viewfinder and fogging a film unit. To insure complete closure of the aperture, the flexible member has a shape which conforms closely to the shape of the upper wall, especially in the area surrounding the aperture. In the preferred embodiment, the flexible member is formed with a dimple to accommodate a short projection of the upper wall into the exposure chamber in the area immediately surrounding the aperture.

There is only a small amount of space between the edges of the capping plate and the sides of the boot. During the initial upward rotation of the capping plate, air can readily escape from the diminishing space between the capping plate and the top of the boot. Before the capping plate reaches its uppermost position, the flexible member contacts the upper wall, thereby restricting the escape of air. The restricted air flow and the friction of dragging the flexible member along the upper wall dampen the impact of the capping plate stopping at its uppermost position.

DESCRIPTION OF THE DRAWINGS

Other objects and many of the attendant advantages of the present invention will be better appreciated and said invention will become more clearly understood by reference to the following detailed description when considered in conjunction with the accompanying drawings illustrating one embodiment of the instant invention, wherein.

THE PREFERRED EMBODIMENT

Figure 1:
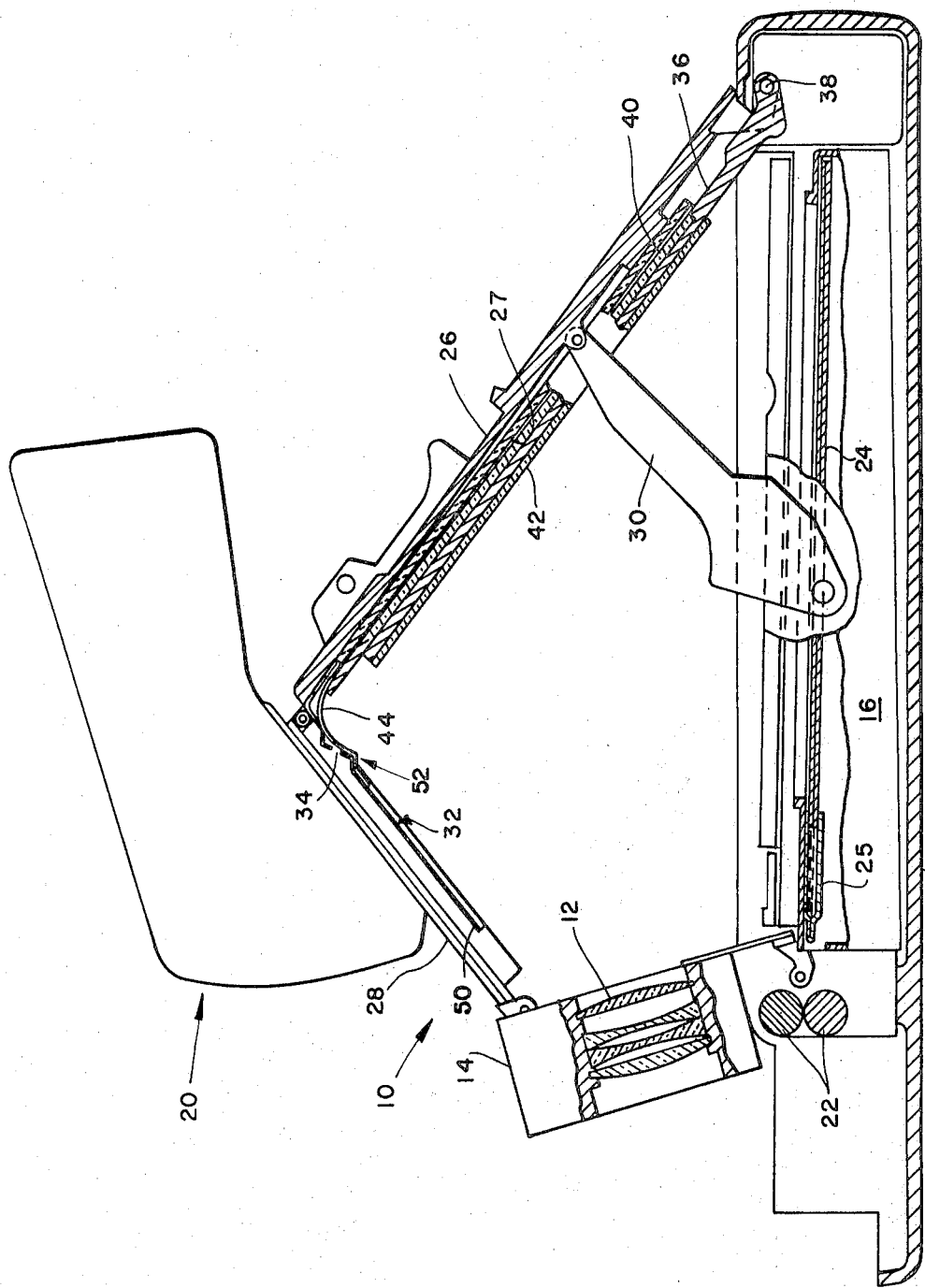
FIG. 1 illustrates a cross-section of a camera with a resilient flap covering an entrance aperture of a viewfinder.

The kind of folding reflex camera for which the present invention is especially suited can be better understood by reference to the above-mentioned patent application, Ser. No. 28,567. FIG. 1 illustrates the general arrangement of components in the reflex camera 10. It has an objective lens 12 mounted in a front housing 14, means for receiving a film cassette 16 in the base 18 of the camera 10, and a viewfinder 20 by means of which a photographer can aim and focus the camera 10. The camera 10 also has a pair of rollers 22 which receive a self-processing film unit 24 as it emerges from the cassette 16, rupturing a chemical pod 25 and discharging the film unit 24 from within the camera 10, in a manner well known in the art.

The front housing 14, the viewfinder 20, as well as a long cover 26 and a short cover 28, are articulated such that they can be erected to form an exposure chamber over the base 18 as shown in FIG. 1. Their articulation permits them to fold together with the base 18 to form a compact unit for storage. A viewing mirror 27 attached to the underside of the long cover 26 reflects the image formed by the objective lens 12 toward a viewing plane of the camera 10 proximate the film unit 24. The viewing mirror 27 also reflects light emanating from the image formed in the viewing plane into the viewfinder 20. An arm 30 maintains the articulated members erect to form the exposure chamber. To fold the camera 10 for storage, the photographer pushes on the arm 30 to unlock it, permitting the articulated members 26 and 28 to fold flat.

Within the exposure chamber, partially defined by the articulated members 26 and 28, is a flexible bellows 32 (for clarity shown only in part in FIG. 1) which excludes light from the exposure chamber except as admitted by the objective lens 16 during an exposure. An aperture 34 located in the upper portion of the bellows 32 permits light in the exposure chamber to enter the viewfinder 20. The aperture 34 must be closed during a photographic exposure to prevent stray light entering the viewfinder 20 from reaching the film unit 24.

Within the bellows 32 is a capping plate 36 which rotates about an axle 38. The capping plate 36 carries a focusing screen 40 on its upper surface and carries a reflex mirror 42 on its underside. A flexible but resilient flap 44 attached to the swinging (free) end of the capping plate 36 covers the aperture 34 when the capping plate 36 rotates to its uppermost position. The configuration illustrated in FIG. 1 is the photographic exposure mode of the camera 10. The capping plate 36 rotated to its extreme clockwise position uncovers the uppermost film unit 24 within the cassette 16. In its extreme clockwise position, the capping plate 36 places the flap 44 over the aperture 34 to block light which might otherwise reach the film unit 24 through the aperture 34, and it positions the reflex mirror 42 so it will reflect the image formed by the objective lens 16 onto the photosensitive surface of the film unit 24.

Figure 4:
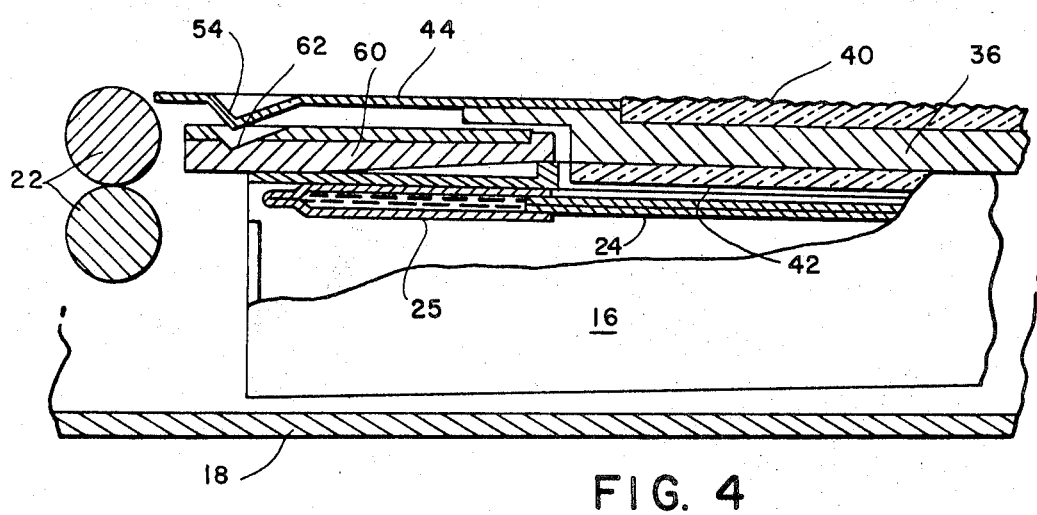
FIG. 4 illustrates the position of the resilient flap when the entrance aperture is uncovered.
Figure 3:
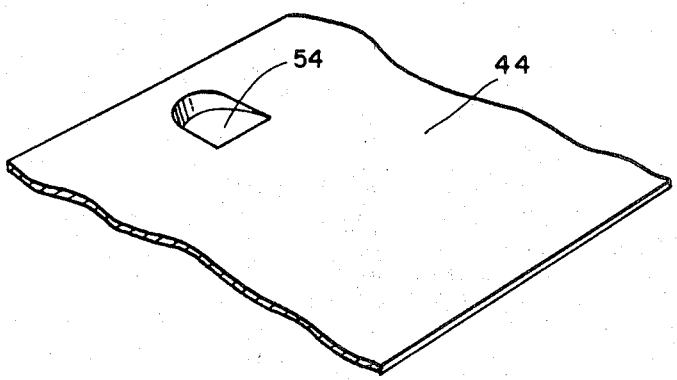
FIG. 3 illustrates a detail of the resilient flap.

In the other mode of camera 10, the focusing mode (not illustrated by FIG. 1, but a detail of which is shown in FIG. 4), the capping plate 36, rotated to its extreme counterclockwise (lowermost) position, rests against the cassette 16 thereby covering the film unit 24 within the cassette 16. In its extreme counterclockwise position, the capping plate 36 positions the focusing screen 40 in the viewing plane of the camera 10 and, of course, it removes the flap 44 from the aperture 34 thereby permitting light, reflected by the focusing screen 40, to enter the viewfinder 20 through the aperture 34.

The wide flap 44 extending forward from the capping plate 36 also protects the uppermost film unit 24 from fogging while the camera is in transition between the two modes. While the camera makes the transition between modes, the objective lens shutter (not shown) is closed. However, during the short time of transition, the aperture 34 is open, but the film unit 24 is not covered by the capping plate 36. During the transition, the capping plate 36 protects a large portion of the film unit 24 from being fogged by shading it from light entering the chamber through the aperture 34. However, it does not protect all of the film unit 24. The flap 44 protects the rest of the film unit 24 during the transition. Its resilience causes it to extend forwardly from the free end of the capping plate 36 during the transition. The width of the flap 44 and its extension from the capping plate 36 enable it to shade the unprotected portion of the film unit 24 preventing it from being struck by light entering the chamber through the aperture 34.

The capping plate 36 alone suffices to shade the film unit 24 from light entering the exposure chamber through the aperture 34 during the lower portion of its rotation. During the upper portion of its rotation, the end of the film unit 24 would be fogged except for the presence of the flap 44 extending from the free end of the capping plate 36. Since the flap 44 shades the film unit 24 only during the upper portion of the rotation, when the flap 44 is close to the aperture 34, the width of the flap 44 can be substantially less than the width of the film unit 24. The flap 44, in the embodiment illustrated, has a width approximately one-third that of the film unit 24; its extension from the capping plate 36 is determined by the need to cover the aperture 34 while the capping plate 36 is in its uppermost position. The size and shape of the flap 44 will vary according to the particular embodiment of the camera 10 and the configuration of its elements.

Some stray light rays entering the aperture 34 before the flap 44 closes it might reach the film unit 24 indirectly by multiple reflections from the internal surfaces of the chamber and the components therein. Black coatings and finishes on the internal surfaces of the chamber and flap absorb most of the stray light rays. Those not absorbed are severely attenuated in their intensity and cannot fog the film unit 24, even if they reach it, because of the short duration of transition.

Figure 2:
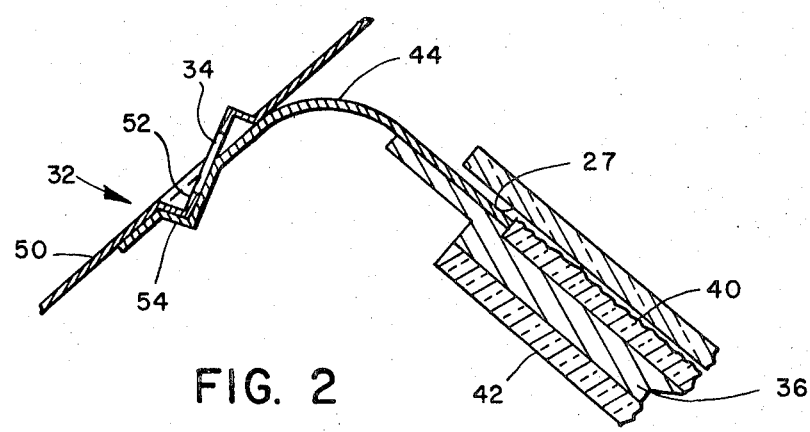
FIG. 2 illustrates an enlarged portion of the device of FIG. 1 showing the lighttight seal effected by the resilient flap against the entrance aperture.

Reference should now be had to FIG. 2 for a better understanding of how the flap 44 seals the aperture 34 in the bellows 32. Certain considerations pertinent only to the optical design of the viewfinder 20 suggest a particular orientation for the plane of the aperture 34 to achieve optimum imagery therein. However, due to mechanical considerations pertinent to the design of the bellows 32 and the exposure chamber, the preferred plane for the forward wall 50 of the bellows 32 is parallel to the small cover 28. To satisfy both conditions, the forward wall 50 is formed with a tilted section 52. The section 52, in which the aperture 34 is formed, has the orientation desired for optical considerations, whereas the remainder of the forward wall 50 follows the small cover 28. The small amount of space in a compact folding camera 10 of the present type makes it preferable that the section 52 not project out of the general plane of forward wall 50 very much. Therefore, the area of the section 52 is quite small, not much greater than the actual size of the aperture 34, and it is positioned to project equally on both sides of forward wall 50. In consequence, the flap 44 must somehow be tailored to fit over the projection of the section 52 into the exposure chamber if it is to make proper contact with the forward wall 50 to seal the aperture 34. Forming a sloping dimple 54 in the flap 44 is found to be a suitable way to avoid the possibility that the projection of section 52 into the exposure chamber might prevent the flap 44 from adequately sealing the aperture 34. FIG. 4 illustrates the section of the flap 44 in which the dimple 54 is formed. The dimple 54 need only be wide enough and deep enough to receive the inward projection of section 52.

FIG. 2 shows the capping plate 36 in its extreme clockwise (uppermost) position with the flap 44 bearing against the forward wall 50 and closing the aperture 34. The area of the flap 44 in contact with the forward wall 50 of the bellows 32 affords an excellent light seal. Furthermore, the flexible nature of the flap 44 allows it to conform to the bellows 32 and thereby seal the aperture 34 without regard to minor distortions in the configuration of the bellows 32.

The flap 44 is urged into this conforming contact with the bellows 32 by its own resiliency which causes it to resist backward bending as the capping plate 36 moves upwardly bringing the flap 44 into contact with the bellows 32. The resiliency also aids, as noted above, in preventing fogging while the camera makes a transition from one mode to another. This means of sealing the aperture 34 might distort the shape of the aperture 34 slightly or temporarily urge it out of its preferred location, yet is seals nevertheless. Moreover, it has the advantage that when the capping plate 36 rotates downward, disengaging the flap 44 from the bellows 32, no part of the aperture closing means remains in contact with the bellows 32. Therefore, the aperture 34 returns immediately to the preferred position and no mechanical parts remain behind to distort it or pull it out of position.

When the capping plate 36 rotates downward covering the cassette 16 to protect the film unit 24, it removes the flap 44 from the aperture 34. Thus, light from an image formed on the focusing screen 40 can enter the viewfinder 20. While the camera 10 is in the viewing mode, light enters the exposure chamber. To prevent the fogging of the uppermost film unit 24, capping plate 36 has sealing means to prevent the entrance of light into the cassette 16. In addition to its primary function, the flap 44 serves an auxiliary function as part of the sealing means for the cassette 16. A section 60 of the camera 10 opposite the flap 44 (in the focusing mode, see FIG. 4) has a receptacle 62 into which the dimple 54 can fit. Thus, the flap 44, which extends forward some distance and is also relatively wide, can come quite close to the section 60 and, consequently, inhibit or prevent the passage of stray light between the section 60 and the flap 44. While FIG. 4 shows the flap attached to the topside of a lip 37 on the capping plate 36, it will be understood that it can accomplish the preceding function if attached to the underside of the lip 37.

In cameras of the type described, it is important to minimize the possibility of certain dynamic effects, stemming from the rapid upward rotation of the capping plate 36, which might adversely affect the quality of photographs. Vibration and bouncing of the mirror 42, which is carried on the capping plate 36, causes the image it reflects to move about on the film unit 24 creating a blurred photograph. This occurs in two ways: the image on the film unit 24 moves about due to changes in the angle of incidence of the light at the mirror 42; and, the image goes in and out of focus because the bouncing of the mirror alters the optical distance between the objective lens 16 and the film unit 24. It should be understood that the reflection at the mirror 42 magnifies the dynamic behavior of the mirror as it affects the image on the film unit 24. Further, too great an impact of the capping plate at its uppermost point might jolt the camera 10, throwing off the user's aim. For reasons not fully understood, it has been found that the capping plate 36, together with the flap 44, does not suffer from these adverse dynamic effects. Significant amounts of bounce or vibration or jolt are not experienced when the capping plate 36 is operated.

It is theorized that as the capping plate 36 reaches its uppermost position and the flap 44 comes into contact with the forward wall 50 of the bellows 32, continued upward movement requires the flap 44 to quickly bend back bringing more of its area into contact with the wall 50 of the bellows. Thus, frictional drag between the flap 44 and the bellows 32 increases rapidly just as the capping plate 36 arrives at its uppermost position. Additionally, the flap 44 contacts the forward wall 50 of the bellows 32 and inhibits the escape of air from the diminishing space between the capping plate 36 and the long cover 26. The capping plate 36 is wider than the film unit 24 and slightly narrower than the bellows 32. It follows that since air can now only escape through the small gaps between the capping plate 36 and the side walls of the bellows 32, the arrangement, aforesaid, dampens the impact of the capping plate 36 to prevent any consequential bounce or vibration of the reflex mirror 42. Widening the flap 44 further restricts the escape of air and improves the damping.

The flap 44 extending from the capping plate 36 provides a simple, reliable means for closing the aperture 34 and protecting the film unit 24 from fogging during operation of the camera 10. It serves its functions without complicating the operating mechanism of the camera 10 by adding another mechanical linkage. It utilizes linkages already present. A further advantage of this simple means for inhibiting unwanted light rays from fogging a film unit 24 is that it requires virtually no storage space in the folded, closed camera.

It can be readily seen that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practiced in a manner than otherwise specifically described herein.

What is claimed is:

1. A photographic camera comprising:
   means for defining an exposure chamber having an aperture disposed therethrough and including a film plane;
   an objective lens for selectively exposing a film unit positioned at said film plane to image-carrying light rays;

a capping plate mounted within said exposure chamber for displacement between a first terminal position wherein it precludes light rays entering said chamber through said aperture and said objective lens from impinging upon said film plane and a second terminal position wherein it does not preclude any light rays entering said chamber through said aperture and said objective lens from impinging upon said film plane;

a viewing device communicating with said chamber through said aperture; and means for blocking all light rays entering said chamber through said aperture from directly impinging upon a film unit positioned at said film plane during displacement of said capping plate from its said first terminal position into its said second terminal position, said blocking means including opaque means extending from said capping plate into sliding contact with an adjacent interior surface of said chamber defining means.

2. The camera described in claim 1, wherein said opaque means precludes light from entering said chamber through said aperture when said capping plate is at said second terminal position.

3. The camera described in claim 2, wherein said opaque means includes a resilient flexible flap having a shape that conforms to the shape of said exposure chamber in the region of it surrounding said aperture.

4. The camera described in claim 1, wherein said opaque means includes a resilient flexible member, having a width less than the width of said film unit, attached to and extended from an end of said capping plate, said capping plate pivoted for displacement about its other end.

5. The camera described in claim 1, wherein the width of said capping plate is slightly less than the width of said exposure chamber so as to restrict the movement of air between said capping plate and said exposure chamber as said capping plate moves between said first and second terminal positions.

6. The camera described in claim 5, wherein said opaque means comprises a resilient flexible flap having a width less than the width of said capping plate.

7. In combination with a camera of the type having: an enclosure; a film plane inside said enclosure; an objective lens in a first wall of said enclosure; a capping plate, normally disposed at a first terminal position in which it substantially parallels and covers said film plane, rotatable about an axis at one end of said capping plate into a second terminal position that allows optical communication between said objective lens and said film plane; a focusing screen in said enclosure; an aperture located in a second wall of said enclosure where said capping plate will not block the passage of light through it; and a viewfinder that optically communicates with said focusing screen through said aperture, the improvement comprising means, attached to the other end of said capping plate and extending beyond said other end a predetermined distance so as to cooperate with said capping plate to block the direct passage of all light rays from said viewfinder through said aperture to said film plane while said capping plate rotates from said first terminal position to said second terminal position, and while it returns, so as to inhibit fogging of a photosensitive film unit situate at said film plane.

8. The improved camera described in claim 7, wherein said means closes said aperture while said capping plate remains at said second terminal position.

9. The improved camera described in claim 8, wherein said second wall is a flexible portion of a collapsible boot and said means is a flexible and resilient flap, with a width less than the width of said film plane, that will contact said second wall and will conform to its shape so as to cover said aperture, while said capping plate remains in said second terminal position, said capping plate being at an oblique angle to said second wall while in said second terminal position, said flap extends outwardly from said other end of said capping plate while said capping plate rotates from said first to said second terminal position, and said flap bends from contact with said second wall so it will not distort said second wall, while closing said aperture, as said capping plate reaches said second terminal position oblique to said second wall.

10. The improved camera described in claim 7, wherein said means includes a flexible and resilient flap with a width less than the width of said film plane.

11. The improved camera of claim 7, wherein a portion of said second wall surrounding said aperture protrudes into said enclosure and said means has a shape that conforms to the shape of said second wall surrounding said aperture.

12. A reflex camera comprising:
a film plane;
an objective lens;
a viewfinder;
a capping plate normally disposed in a first terminal position in which said capping plate covers said film plane of said camera, said capping plate being movable, by rotating about an axis disposed at one end thereof, to a second terminal position in which said capping plate uncovers said film plane and does not block said viewfinder;
operating means for moving said capping plate from said first terminal position to said second terminal position; and
a resilient and flexible member, attached to the other end of said capping plate, opposite said axis, and coacting with said capping plate for preventing the direct passage of light entering through said viewfinder to said film plane while said capping plate moves between said first and second terminal positions and while said capping plate is in said second terminal position.

13. The reflex camera described in claim 12, wherein said resilient and flexible member engages a wall of an enclosure, which contains said capping plate and said film plane, as said capping plate approaches said second terminal position, said wall having a shape such that said resilient member is increasingly deflected as said capping plate approaches said second terminal position.

14. The reflex camera described in claim 12, further comprising:
an aperture in said wall through which light communicates between said viewfinder and said enclosure; and
said resilient and flexible member has a shape that conforms to the shape of said wall at the region of said wall surrounding said aperture.

15. A reflex camera comprising:
an objective lens;

a viewfinder having an entrance aperture located in a flexible wall;

mirror means pivotally mounted adjacent one side of a focal plane of said objective lens so as to rotate between a first terminal position covering and substantially paralleling said focal plane and a second terminal position oblique to said focal plane whereat said mirror means reflects a real image formed by said objective lens to said focal plane and does not block said entrance aperture; and opaque means, capable of conforming to said flexible wall and attached to said mirror means, for coacting with said mirror means to shade said focal plane from light which might pass through said entrance aperture in said flexible wall while said mirror means rotates between said first and second terminal positions, and for blocking said aperture while said mirror means is at said second terminal position.

16. The reflex camera of claim 15, wherein said opaque means is flexible and resilient.

17. The reflex camera of claim 16, wherein said opaque means extends beyond said mirror means so as to come into contact with said flexible wall, as said mirror means rotates to said second position, before said opaque means blocks said entrance aperture.

18. The reflex camera of claim 15, wherein said opaque means has a width less than the width of said focal plane.

19. In combination with a camera of the type having a film plane; an objective lens; a viewfinder; mirror means, normally disposed in a first terminal position substantially paralleling and covering said film plane and rotatable, about a pivot located near one end of said mirror, between said first terminal position and a second terminal position where said mirror reflects an image formed by said objective lens towards said film plane; operating means for rotating said mirror from said first terminal position to said second terminal position; an enclosure containing said mirror and said film plane and having an opening in a forward surface for admitting light from said objective lens; and an aperture in a wall where said mirror will not block it for allowing light from said enclosure into said viewfinder, the improvement that comprises: a resilient and flexible tab member substantially larger than said aperture, attached to the end of said mirror furthest from said pivot, with a shape generally conforming to the shape of said wall surrounding said aperture, and extending beyond said furthest end so as to come into contact with said wall during the rotation of said mirror, but prior to the arrival of said mirror at said second terminal position, said tab member and said mirror coacting to shade said film plane while said mirror moves between said first and second terminal positions, said tab member covering said wall surrounding said aperture so as to close said aperture while said mirror is in said second terminal position.

20. The improvement described in claim 19, wherein said wall has a tilted portion surrounding said aperture and said tab member has a dimple conforming to said tilted portion.

21. The improvement, for use with a camera of the type having a film plane; an objective lens; a viewfinder; a mirror normally disposed in a first terminal position covering said film plane and rotatable, about one edge, between said first terminal position and a second terminal position where said mirror reflects an image formed by said objective lens towards said film plane; operating means for rotating said mirror from said first terminal position to said second terminal position; an enclosure containing said mirror and said film plane and having an opening in a forward surface for admitting light from said objective lens; and an aperture, located in a wall of said enclosure where said mirror will not block it, for allowing light from a focusing screen in said enclosure to enter said viewfinder, comprising:

a resilient flap attached to the moving end of said mirror, said resilient flap extending beyond said moving end so as to shade at least a portion of said film plane from light entering said enclosure through said aperture while said mirror rotates between said first and second terminal positions and so as to block the passage of light through said aperture while said mirror is in said second terminal position.

22. The improvement described in claim 21, wherein said resilient flap has a dimple to receive a projection, surrounding said aperture, of said wall into said enclosure so as to permit said resilient flap to conform to said wall.

23. A photographic camera comprising:

a camera case of several sections articulated to unfold and thereby increase its interior volume;

a flexible bellows attached to said several sections so as to form with them an exposure chamber;

an objective lens, in a first section of said camera case, for forming a real image of a subject inside said exposure chamber;

a focal plane inside said exposure chamber proximate a second section of said camera case that is adjacent said first section;

means to locate a film unit at said focal plane;

a capping plate, inside said exposure chamber, pivoted at its end furthest from said objective lens for rotation between a first terminal position at which it substantially parallels and covers said film unit protecting it from fogging by light within said exposure chamber and a second terminal position that leaves said film unit uncovered;

a viewfinder situate outside said exposure chamber, opposite said focal plane, for forming a virtual image of a focusing screen and a real image formed thereon;

an aperture, in a wall of said flexible bellows opposite said focal plane where said capping plate will not block it, for permitting optical communication between said exposure chamber and said viewfinder;

a mirror, attached to a third section of said camera case and situate opposite said objective lens and said focal plane, for reflecting said real image from said objective lens to said focal plane;

a focusing screen, attached to said capping plate, for receiving said real image and for reflecting the light forming said real image through said aperture into said viewfinder when said capping plate is at said first terminal position;

a resilient and flexible opaque flap, having a width approximately equal to the width of said film unit, extending from the end of said capping plate closest to said objective lens, so as to block said aperture while said capping plate is in said second terminal position, said flap having a shape that will conform to the shape of said wall of said flexible bellows surrounding said aperture, said flap and said capping plate coacting to shade said film unit from all light entering said exposure chamber through said viewfinder while said capping plate moves between said first and said second terminal positions; and means, on the interior surfaces of said exposure chamber, for inhibiting the reflection of and for absorbing incident light rays.

* * * * *